Figures 1, 2, 3:
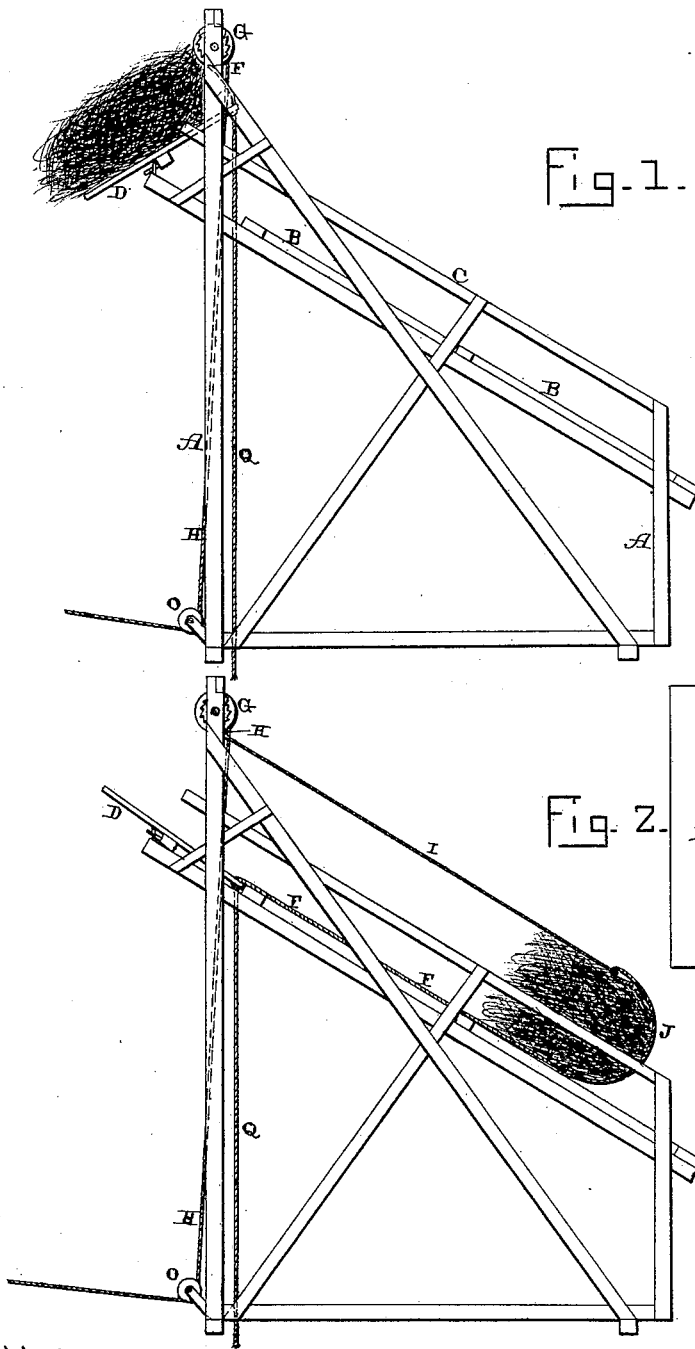

(No Model.)

D. W. BOVEE.
HAY STACKER.

No. 402,895. Patented May 7, 1889.

Witnesses:
E. P. Ellis,
Allen A. Pattison

Inventor:
David W. Bovee,
per F. A. Lehmann, atty

UNITED STATES PATENT OFFICE.

DAVID WILLIAM BOVEE, OF TAMA, IOWA.

HAY-STACKER.

SPECIFICATION forming part of Letters Patent No. 402,895, dated May 7, 1889.

Application filed October 23, 1888. Serial No. 288,936. (No model.)

*To all whom it may concern:*

Be it known that I, DAVID WILLIAM BOVEE, of Tama, in the county of Tama and State of Iowa, have invented certain new and useful Improvements in Hay-Stackers; and I do hereby declare the following to be a full, clear, and exact description of the invention, such as will enable others skilled in the art to which it pertains to make and use it, reference being had to the accompanying drawings, which form part of this specification.

My invention relates to an improvement in hay-stackers; and it consists in the combination of a suitable frame-work up over which the hay is drawn, a tilting platform at the top of the frame-work, ropes attached to the lower edge of the platform, and a drum provided with ropes, whereby the load of hay can be taken directly from the wagon, moved up over the inclined frame, and then dumped upon the stack, as will be more fully described hereinafter.

The object of my invention is to provide a hay-stacking mechanism, whereby the whole load of hay can be taken from the wagon and either dumped directly upon the stack or can be held at the top of the frame upon the tilting platform, so that it can be used in topping off the stack, thus greatly decreasing the amount of labor required to build a stack in the ordinary manner.

Figure 1 represents a side elevation of a hay-stacker which embodies my invention. Fig. 2 is a similar view showing the tilting platform in a horizontal position. Fig. 3 is a plan view showing the cylinder or drum.

A represents a suitable frame-work of any desired construction, and which has an inclined top, B, up over which the hay is drawn directly from the wagon. On each side of the frame are the guards C, which rise a suitable distance above the inclined top B for the purpose of preventing the hay from dropping off sidewise. The lower end of this inclined top B is on a level with the wagon from which the load of hay is to be taken, while its upper end will be about on a level with the top of the stack which is to be formed. This top B does not extend all the way up the frame, but very nearly so. At the top of the frame is placed the tilting platform D, which is loosely connected to the frame, and to the lower edge of which are fastened a suitable number of ropes, F, which extend downward over the inclined top B and are fastened at their lower ends to the ropes J, which are placed upon the wagon-bed before the hay is piled thereon. This platform remains about on a line with the inclined top B while the load is being elevated, but when the load has reached the top of the frame it tilts outward so as to dump the load directly upon the stack.

Journaled upon the uprights of the frame, which project above its upper end, is a drum, G, around which the operating-rope H is wrapped, and around which the elevating-ropes I are wrapped as the load of hay is drawn up the inclined top B. The upper ends of the ropes I are fastened to the drum G, while their lower ends pass over the top of the load of hay as it rests upon the wagon, and are fastened to opposite ends of the ropes J, placed upon the wagon from those to which the ropes F are fastened. The operating-rope extends down around the guiding-pulleys O and is fastened to the draft-animal. The drum G is provided with a pawl and ratchet, so that the load of hay can be held at any point. While the load of hay is being moved up over the inclined top B by the drum G, which is turned through the rope H by the draft-animal, the platform D remains in an inclined position until the load reaches the top of the frame A, when the platform D tilts outward both from the load of hay upon it and from the continued drawing of the ropes F against the lower side of the hay. After the stack has been nearly completed and it is desired to use a portion of the hay for topping off the stack the platform D is allowed to assume a horizontal position, and then the draft-animal is stopped and the platform is fastened in a nearly-horizontal position by means of a rope or ropes, Q, which extend downward from its lower end and which can be fastened to the frame A. The platform D being thus held in a horizontal position is perfectly safe for a man or men to mount thereon and throw the hay from this platform upon the top of the stack for the purpose of topping it.

Having thus described my invention, I claim—

1. In a hay-stacker, a tilting platform connected to the upper end of the frame, elevating-ropes connected thereto at its lower edge, a drum, and elevating-ropes connected to the drum, substantially as shown.

2. In a hay-stacker, the combination of a suitable frame-work having an inclined top, a pivoted platform connected to its upper end, ropes connected to the lower end of the platform, ropes which are placed under the hay, a drum, and ropes connected to the drum both for operating the drum and raising the hay, substantially as set forth.

In testimony whereof I affix my signature in the presence of two witnesses.

DAVID WILLIAM BOVEE.

Witnesses:
J. C. POTTER,
J. G. CHRISTOPHER.